United States Patent

Hane et al.

[11] Patent Number: 6,162,383
[45] Date of Patent: Dec. 19, 2000

[54] METHOD OF DIAMETRALLY EXPANDING AN ELASTIC TUBE

[75] Inventors: Yoshinari Hane, Kanagawa-ken; Isao Takaoka, Hiratsuka; Toyoaki Tashiro, Hiratsuka; Hiroshi Uchida, Hiratsuka, all of Japan

[73] Assignee: The Furukawa Electric Co., Ltd., Tokyo, Japan

[21] Appl. No.: 09/180,792

[22] PCT Filed: Mar. 25, 1997

[86] PCT No.: PCT/JP97/00983

§ 371 Date: Nov. 13, 1998

§ 102(e) Date: Nov. 13, 1998

[87] PCT Pub. No.: WO98/42494

PCT Pub. Date: Oct. 1, 1998

[51] Int. Cl.[7] .......................... B29C 65/44; B29C 65/02; B29C 65/00
[52] U.S. Cl. .......................... 264/221; 264/317; 264/319; 264/323; 264/DIG. 44; 425/176; 425/403; 425/DIG. 12; 29/446; 29/447; 29/450
[58] Field of Search .............................. 264/28, 219, 221, 264/317, 322, DIG. 44, 296, 230, 338, 890.144, 446, 447, 450, 451, 319, 323; 425/176, 393, 403, DIG. 12

[56] References Cited

U.S. PATENT DOCUMENTS 3,319,328  5/1967  Finger et al. .
3,515,798  6/1970  Sievert ..................................... 174/135
4,146,302  3/1979  Jachimowicz ............................. 385/111
4,174,365  11/1979  Pahl ........................................ 246/146
4,177,237  12/1979  Ueno et al. ............................... 264/296
4,537,736  8/1985  Peltzman et al. ......................... 264/130
5,098,752  3/1992  Chang et al. ............................. 428/34.9
5,194,208  3/1993  Monthey et al. ......................... 264/130
5,406,871  4/1995  Lambert, Jr. ............................. 138/103
5,735,554  4/1998  Imgam ..................................... 285/239
5,844,170  12/1998  Chor et al. ............................. 174/74 A

FOREIGN PATENT DOCUMENTS 59-20618  2/1984  Japan .
63-74624  4/1988  Japan .
2-193518  7/1990  Japan .
2-197208  8/1990  Japan .

*Primary Examiner*—Jan H. Silbaugh
*Assistant Examiner*—Michael I. Poe
*Attorney, Agent, or Firm*—Frishauf, Holtz, Goodman, Langer & Chick, P.C.

[57] ABSTRACT

A method of diametrally expanding an elastic tube (6), which includes the steps of inserting a distal end portion of a expansion member (1) into an elastic tube (6), the expansion member (1) being provided at least at a surface thereof with a solidified layer of a low melting point material, and the distal end portion (4) of the expansion member (1) being tapered, a tip end of which having a diameter which is equal to or smaller than an inner diameter of the elastic tube (6), and moving the elastic tube (6) over the solidified layer to diametrally expand the elastic tube (6), the surface of the solidified layer being made into a low frictional surface due to a melting of the low melting point material.

2 Claims, 4 Drawing Sheets

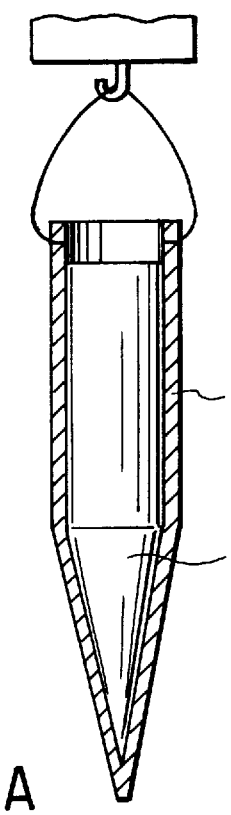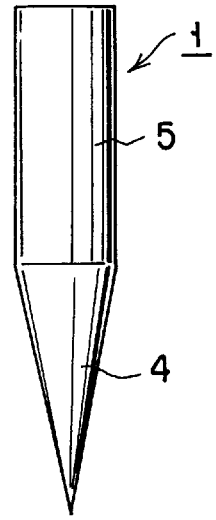
FIG. 1A          FIG. 1B
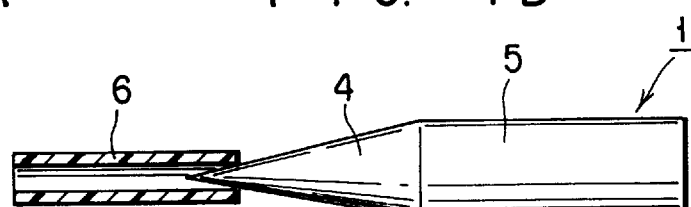
FIG. 2A
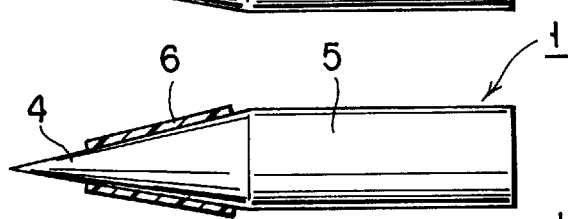
FIG. 2B
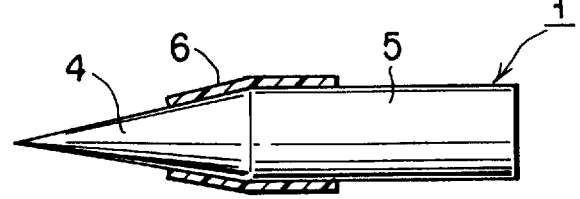
FIG. 2C
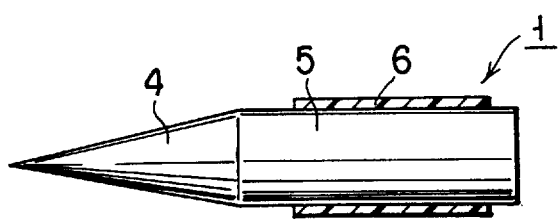
FIG. 2D

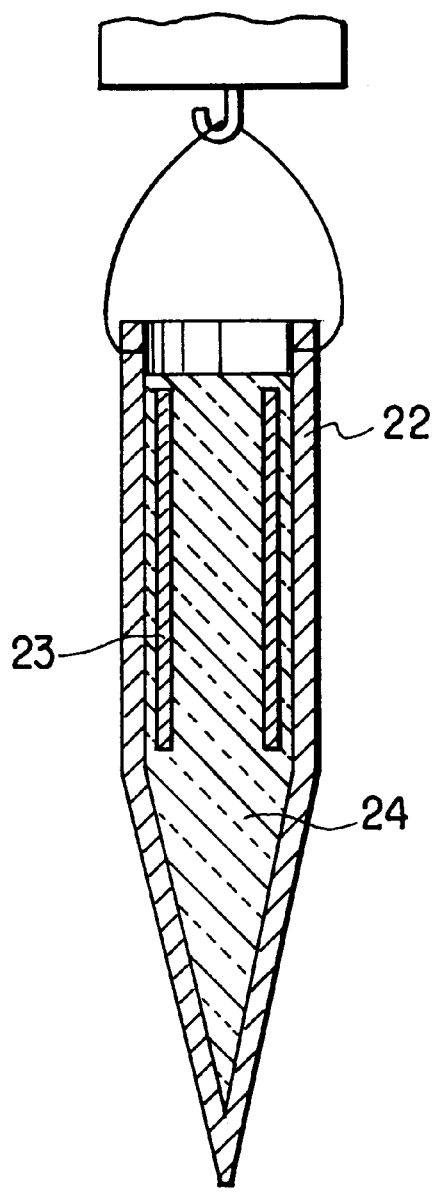
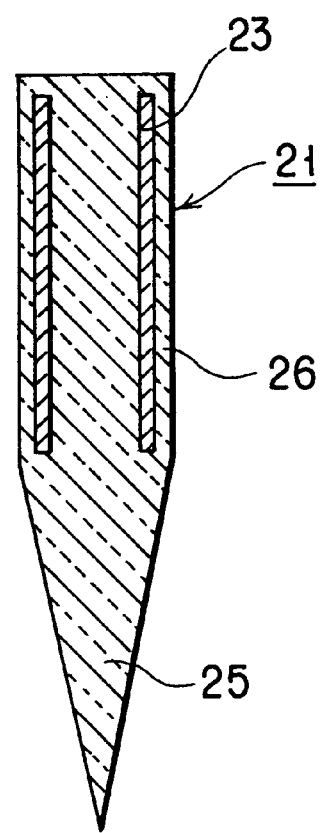
F I G. 5A    F I G. 5B

METHOD OF DIAMETRALLY EXPANDING AN ELASTIC TUBE

FIELD OF THE INVENTION

This invention relates to a method of expanding the diameter of an elastic tube, and in particular to a method of expanding the diameter of an elastic tube which is adapted to be employed for enclosing the joint portion, for instance of electric wire, cable, pipe, etc.

BACKGROUND INFORMATION

In recent years, there has been developed, for the purpose of protecting, insulatively enclosing or repairing a joint portion of electric wire, cable, pipe, etc., a method of employing a self-shrinkable elastic tube which is capable of covering the joint portion without necessitating the application of heat in place of the conventional method of using a heat-shrinkable tube. This self-shrinkable elastic tube is made of a rubber-like elastic material and is normally supported in advance on a tubular rigid supporting body whereby the inner diameter of the elastic tube is kept in an expanded state.

In the employment of the self-shrinkable elastic tube, the self-shrinkable elastic tube is inserted over a joint portion of power cable for instance while it is kept in an expanded state as mentioned above, and then the supporting body is withdrawn from the self-shrinkable elastic tube, thereby allowing the self-shrinkable elastic tube to be shrunk diametrally, thus obtaining the joint portion which is hermetically covered by the elastic tube.

There has been conventionally proposed the following method as a means to expand the diameter of such an elastic tube.

Namely, first of all, an elongated bag-like expandable hollow body twice as long as that of the self-shrinkable elastic tube is prepared. Then, the fore half portion of this expandable hollow body is inserted into the self-shrinkable elastic tube, and then the expandable hollow body is entirely expanded by means of a pressurized air whereby diametrally expanding the self-shrinkable elastic tube. Thereafter, a supporting body disposed on the side of the rear half portion of the expandable hollow body is forcibly introduced into the fore half portion of the expandable hollow body where the self-shrinkable elastic tube is disposed. Then, the pressurized air in the expandable hollow body is withdrawn thereby allowing the expandable hollow body to shrink. As a result, a self-shrinkable elastic tube rested on the supporting body with the self-shrinkable elastic tube being kept expanded can be obtained (Japanese Patent Unexamined Publication S/63-74624).

However, this conventional method is accompanied with the problem that since a bag-like expandable hollow body is rendered to be interposed between a supporting body and a self-shrinkable elastic tube in the process of resting the self-shrinkable elastic tube on the supporting body in this method, the hollow body is ultimately left strongly sandwiched between the supporting body and the self-shrinkable elastic tube. As a result, it is very difficult to remove the supporting body from the self-shrinkable elastic tube at the occasion of mounting the self-shrinkable elastic tube on the joint portion of a power cable for instance.

OBJECTS AND SUMMARY OF THE INVENTION

Therefore, an object of the present invention is to provide a method of expanding the diameter of a self-shrinkable elastic tube, which makes it possible to easily perform the diametral expanding operation of a self-shrinkable elastic tube.

According to this invention, there is provided a method of diametrally expanding an elastic tube, which comprises the steps of:

inserting a distal end portion of an expansion member into an elastic tube, the expansion member being provided at least at a surface thereof with a solidified layer of a low melting point material, and the distal end portion of the expansion member being tapered, a tip end of which having a diameter which is equal to or smaller than an inner diameter of the elastic tube; and moving the elastic tube over the solidified layer to diametrally expand the elastic tube, the surface of the solidified layer being made into a low frictional surface due to a melting of the low melting point material.

According to this invention, there is also provided a method of diametrally expanding an elastic tube, which comprises the steps of:

inserting a distal end portion of a expansion member into an elastic tube; the expansion member being provided at a surface thereof with a solidified layer of a low melting point material and also provided at a rearward thereof with a hole for housing a hollow supporting body therein; and the distal end portion of the expansion member being tapered, a tip end of which having a diameter which is equal to or smaller than an inner diameter of the elastic tube;

moving the elastic tube over the solidified layer to diametrally expand the elastic tube, the surface of the solidified layer being made into a low frictional surface due to a melting of the low melting point material; and allowing the expanded elastic tube to be rested on the hollow supporting body while withdrawing gradually the hollow supporting body from the hole.

According to this invention, there is further provided a method of diametrally expanding an elastic tube, which comprises the steps of:

inserting a distal end portion of a expansion member into an elastic tube; the expansion member being provided at least at a surface thereof with a solidified layer of a low melting point material and also provided rearward therein with a hollow supporting body therein; and the distal end portion of the expansion member being tapered, a tip end of which having a diameter which is equal to or smaller than an inner diameter of the elastic tube;

moving the elastic tube over the solidified layer to diametrally expand the elastic tube, the surface of the solidified layer being made into a low frictional surface due to a melting of the low melting point material; and melting and eliminating the low melting point material thereby allowing the expanded elastic tube to be rested on the hollow supporting body.

As for the low melting point material useful in this invention, there is not any particular limitation as long as it can be melted within the range of temperature which would not dissolve or denature the materials constituting the elastic tube or the hollow supporting body. The melting point of this low melting point material should preferably be −60° C. or more if the elastic tube is formed of silicone rubber. Because if the melting point of this low melting point material is less than −60° C., the elastic modulus of silicone rubber would become less than 1 MPa and hence silicone rubber can hardly be deformed.

Preferable examples of the low melting point material are those which are liquid at normal temperatures, specifically water (melting point: 0° C.), glycerin (melting point: 17° C.), ethylene glycol (melting point: −11.5° C.), etc. Most preferable example of the low melting point material is water, which can be easily solidified into ice.

For example, an expansion member can be manufactured by solidifying water at a temperature of −0° C. to −20° C., and then employed by allowing the ice to melt whereby rendering the surface to become low in friction, thus allowing an elastic tube to be easily slid on the surface of the expansion member in the diametral expanding process of the elastic tube. This is one of most important features of this invention.

The tapered angle of the tapered portion of the expansion member according to this invention should preferably be in the range of 5 to 30 degrees, i.e. 10 to 60 in apex angle. The tip portion of the expansion member where the diameter thereof is not larger than the inner diameter of the elastic tube may not be tapered but may be flat-ended. In other words, the shape of the tip portion of the expansion member may be optionally selected as long as it can be inserted into the elastic tube. The diameter of the tip portion of the expansion member is required to be approximately equal to or smaller than the inner diameter of the elastic tube before the elastic tube is expanded. The expression of "approximately equal to" should be understood to a case where the diameter is slightly larger than the inner diameter of the elastic tube. Because, due to the elasticity of the elastic tube, it is possible to insert the tip end portion of the expansion member into the elastic tube even if the diameter of the tip end of the expansion member is slightly larger than the inner diameter of the elastic tube.

If the angle of the tapered portion of the expansion member is too large, a large force would be required in expanding the diameter of the elastic tube. Moreover, if the angle of the tapered portion of the expansion member is too large, the difference in angle between the tapered portion and the horizontal portion becomes too large so that an excessively large force would be required at the moment of transferring the elastic tube from the tapered portion to the horizontal portion. Therefore, the boundary portion between the tapered portion and the horizontal portion should preferably be as smooth as possible so as to facilitate the movement of the elastic tube over the expansion member.

As explained above, it is possible according to this invention to minimize the frictional force even if the hoop stress of the elastic tube is increased in the expansion in diameter of the elastic tube. Therefore, the tensile stress in the axial direction can be minimized, and hence there is little possibility that the elastic tube is fractured in this process of expanding the elastic tube. Accordingly, it is possible to perform the diametral expansion of the elastic tube without giving a damaging to the. elastic tube.

BRIEF DESCRIPTION OF DRAWINGS

FIGS. 1A and 1B are respectively a cross-sectional view of an expansion member to be employed in a method of expanding the diameter of an elastic tube according to a first embodiment of this invention;

FIGS. 2A to 2D are respectively a side view illustrating the process of expanding the diameter of an elastic tube according to a first embodiment of this invention;

FIGS. 5A and 5B are respectively a cross-sectional view showing a modified example of the expansion member to be employed in the method of diametrally expanding an elastic tube according to a third embodiment of this invention.

DETAILED DESCRIPTION OF THE PREFERRED EMBODIMENT

Figure 3A:
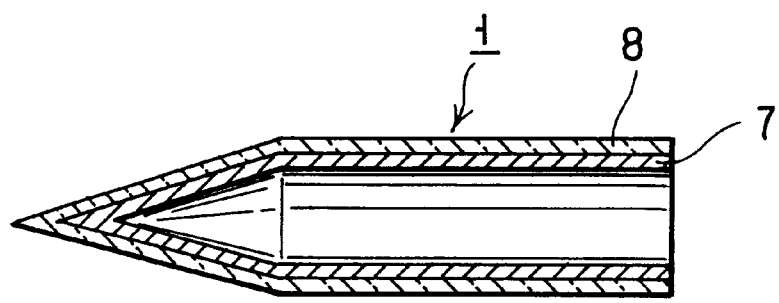
FIGS. 3A and 3B are respectively a cross-sectional view showing a modified example of the expansion member to be employed in the method of expanding the diameter of an elastic tube according to a first embodiment of this invention.

Various embodiments of this invention will be explained with reference to the drawings as follows.

FIGS. 1A and 1B illustrate a expansion member to be employed in the first embodiment of this invention.

As shown in FIG. 1A, the expansion member 1 is placed in a cylindrical container 2 having a conical tip end. In the manufacture of this expansion member 1, a low melting point material 3, typically water, is poured into the container 2. Thereafter, the container 2 is kept in a tank which is cooled to a solidification temperature of the low melting point material 3, whereby the low melting point material 3 is solidified forming the expansion member 1.

FIG. 1B illustrates the expansion member 1 which has been taken out of the container 2. This expansion member 1 is configured to the same shape as that of the interior of the container 2, and hence constituted by a conical distal end portion 4 and a cylindrical barrel portion 5 having the same diameter as that of the maximum diameter of the conical tip portion 4. Since this expansion member 1 is made of the low melting point material 3, the surface thereof melts under normal temperatures, thus making the surface slippery.

The process of expanding the elastic tube 6 by making use of the expansion member 1 shown in FIG. 1B will be explained with reference to FIGS. 2A to 2D. First of all, as shown in FIG. 2A, the elastic tube 6 is inserted over the distal end portion 4 of the expansion member 1. Then, the elastic tube 6 is shifted from the distal end portion 4 up to the cylindrical barrel portion 5 of the expansion member 1. In this case, since the surface of the expansion member 1 is made slippery by the melting thereof, the elastic tube 6 can be easily moved from the distal end portion 4 to the cylindrical barrel portion 5 as shown in FIGS. 2B, 2C and 2D with a weak force. In this manner, the elastic tube 6 can be diametrally expanded.

By the way, the method of moving the elastic tube 6 from the conical distal end portion 4 to the cylindrical barrel portion 5 can be performed by either pushing or pulling the elastic tube 6.

Figure 3B:
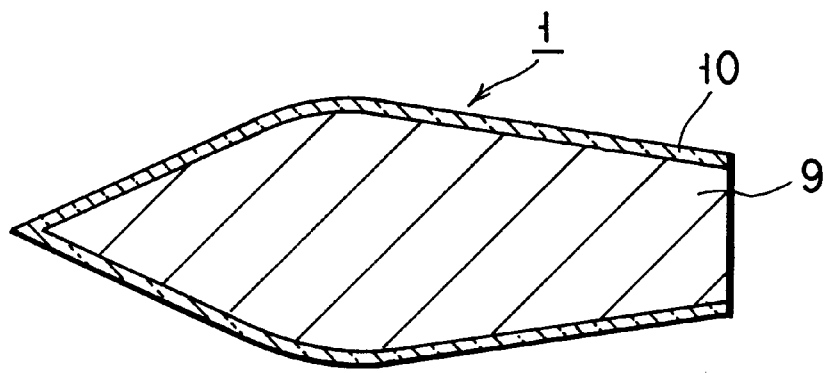

FIGS. 3A and 3B illustrate another example of the expansion member to be employed in the first embodiment of this invention.

In the example shown in FIG. 3A, the expansion member 1 is constituted by a core member 7 of small wall thickness and a solidified layer 8 formed on the outer surface of the core member 7. Namely, since the solidified body of a low melting point material is formed into a thin layer, the quantity of the solidified body can be minimized. As for the material for the core member 7, a material which cannot be denatured or does not exhibit brittleness in the temperature range of from the melting point of the solidified body to the working temperature, such as metal, plastics and wood can be employed.

In the example shown in FIG. 3B, the expansion member 1 is constituted by a solid core member 9 and a solidified layer 10 formed on the outer surface of the core member 9. The shape of the core member 9 is of streamline, so that the elastic tube can be easily moved rearward after it is diametrally expanded. In the case of this expansion member 1, the surface of the core member 9 should preferably be entirely covered by the solidified layer 10. However, in view of facilitating the handling thereof, a portion of the core member 9 may not be covered by the solidified layer 10 if the elastic tube can be satisfactorily expanded diametrally. As for the material of the core member 9, metal, plastics, wood, etc. can be employed.

Figure 4:
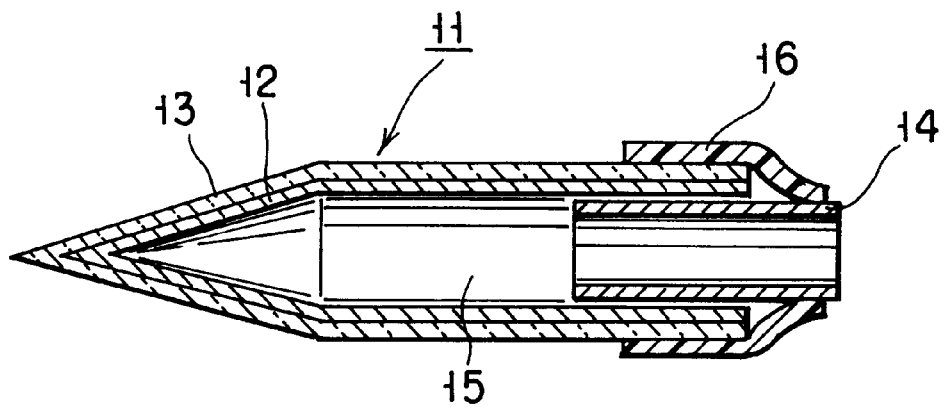
FIG. 4 is a cross-sectional view showing an expansion member to be employed in the method of expanding the diameter of an elastic tube according to a second embodiment of this invention.

FIG. 4 illustrates the expansion member to be employed in the second embodiment of this invention. This expansion member 11 is constituted by a core member 12 and a solidified layer 13 formed on the outer surface of the core member 12. The space in the core member 12 of the expansion member 11 is utilized for housing the hollow supporting body 14. Namely, the rear portion of the core member 12 is elongated as compared with the ordinary expansion member, thus making it possible to house the hollow supporting body 14 for carrying a diametrally expanded elastic tube 16 in the hole 15 formed in the core member 12. As for the material of the core member 21, metal, plastics, wood, etc, can be employed.

This expansion member 11 can be employed as follows. First of all, the hollow supporting body 14 is introduced into the hole 15 of the core member 12. Then, the distal end portion of the expansion member 11 is fitted in the elastic tube 16. Since the surface of the expansion member 11 is slightly melted and made slippery, the elastic tube 16 can be easily diametrally expanded with a small force and moved to the barrel portion of the expansion member 11. Then, as shown in FIG. 4, a hollow supporting body 14 housed in the hole 15 is gradually withdrawn therefrom, whereby allowing the elastic tube 16 to be rested on the surface of the hollow supporting body 14, thus easily manufacturing a self-shrinkable elastic tube.

FIGS. 5A and 5B illustrate the expansion member to be employed in the third embodiment of this invention. As shown in FIG. 5A, this expansion member 21 is housed in a cylindrical container 22 having a conical tip end. In the manufacture of this expansion member 21, a hollow supporting body 23 is temporarily held at a rear portion of the container 22, and then a low melting point material 24, typically water, is poured into the container 22. Thereafter, the container 22 is kept in a tank which is cooled to not more than the solidification temperature of the low melting point material 24, whereby the low melting point material 24 is solidified, thus forming the expansion member 21.

FIG. 5B illustrates the expansion member 21 which has been taken out of the container 22. This expansion member 21 is configured to the same shape as that of the interior of the container 22, and hence constituted by a conical distal end portion 25 and a cylindrical barrel portion 26 having the same diameter as that of the maximum diameter of the conical tip portion 25. Since this expansion member 21 is made of the low melting point material 24, the surface thereof melts under normal temperatures, thus making the surface slippery.

Figure 6A:
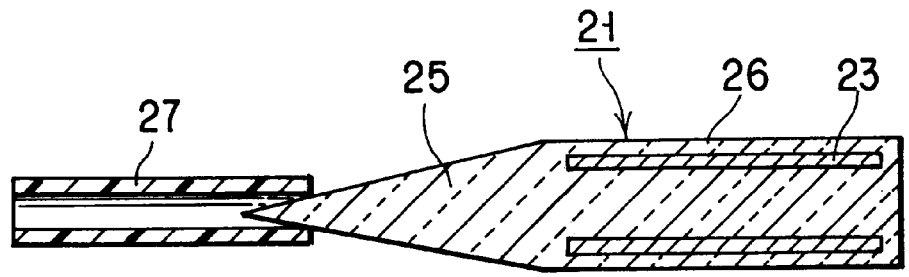
FIGS. 6A to 6E are respectively a cross-sectional view illustrating the process of expanding the diameter of an elastic tube according to a third embodiment of this invention.
Figure 6B:
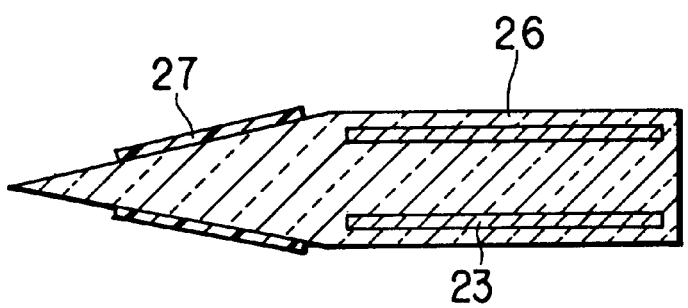
Figure 6C:
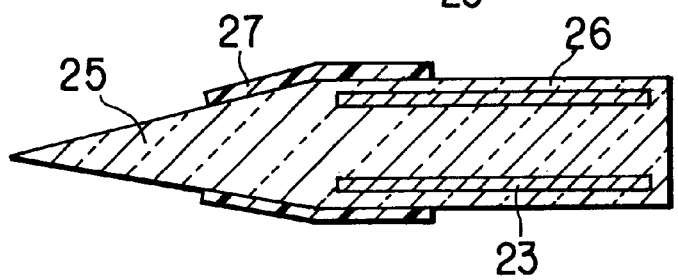
Figure 6D:
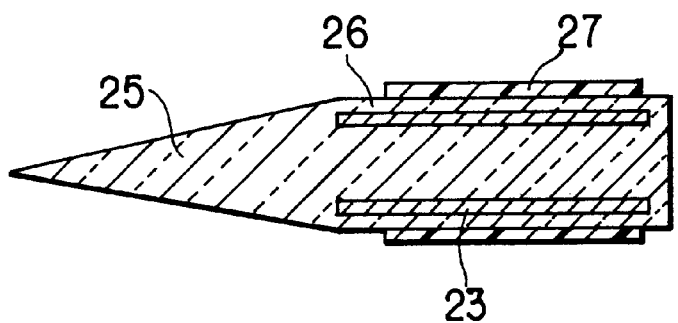

The process of expanding the elastic tube 27 by making use of the expansion member 21 shown in FIG. 5B will be explained with reference to FIGS. 6A to 6E. First of all, as shown in FIG. 6A, the elastic tube 27 is inserted over the distal end portion 25 of the expansion member 21. Then, the elastic tube 27 is shifted from the distal end portion 25 up to the cylindrical barrel portion 26 of the expansion member 21. In this case, since the surface of the expansion member 21 is made slippery by the melting thereof, the elastic tube 27 can be easily moved from the distal end portion 25 to the cylindrical barrel portion 26 as shown in FIGS. 6B, 6C and 6D with a weak force. As a result, the elastic tube 27 is diametrally expanded.

Figure 6E:
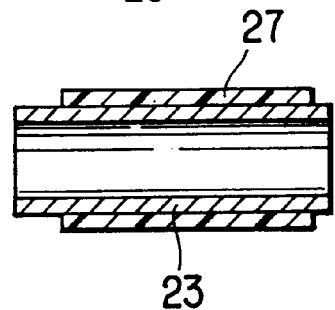

Subsequently, the low melting point material 24 is allowed to melt and eliminated ultimately by heating the expansion member 21 entirely. As a result, a self-shrinkable elastic tube 27 which is rested on the hollow supporting body 23 as shown in FIG. 6E. can be obtained.

In this embodiment, the expansion member 21 is fabricated entirely by a low temperature solidification body except the hollow supporting body 23. However, most of the portion of solidification body except the surface portion is not meaningful in carrying this method, so that the portion of solidification body except the surface portion may be replaced by other materials or an air space so as to reduce the quantity of the low temperature solidification body and to save the solidification time and handling procedure.

As explained above, according to this invention, since the diametral expansion of the elastic tube can be performed by taking advantage of the low frictional melted surface of the expansion member, it is possible to minimize the frictional force even if the hoop stress of the elastic tube is increased in the expansion in diameter of the elastic tube, and hence the tensile stress in the axial direction can be minimized, thus minimizing any possibility of fracturing the elastic tube. Accordingly, it is possible to perform a diametral expansion in a maximum extent irrespective of the wall thickness and diameter of the elastic tube. Further, the diametral expansion of the elastic tube can be performed by utilizing water which is cheap in price, available easily and easy in handling.

According to this invention, since the elastic tube is transferred onto the hollow supporting body by taking advantage of the low frictional melted surface of the expansion member, the tensile stress in the axial direction at the occasion of the transferring the elastic tube can be minimized, thus minimizing any possibility of fracturing the elastic tube. Accordingly, it is possible to perform a diametral expansion in a maximum extent irrespective of the wall thickness and diameter of the elastic tube. It is also possible to efficiently transfer a diametrally expanded elastic tube onto a hollow supporting body in a single processing step. Further, the method of this invention is advantageous in that it utilizes water which is cheap in price, available easily and easy in handling, and also utilizes a cheap housing for hollow supporting body. Of course, there is not any intervening material between the hollow supporting body and the elastic tube as in the case of the conventional method.

According to this invention, since the elastic tube is transferred onto the hollow supporting body by taking advantage of the low frictional melted surface of the expansion member with the solidified layer being ultimately eliminated by the melting thereof, the excessive stress to be applied to the elastic tube can be minimized, thus minimizing any possibility of fracturing the elastic tube. Accordingly, it is possible to utilize an elastic tube of fragile but high quality material. Of course, as mentioned above, there is not any intervening material between the hollow supporting body and the elastic tube as in the case of the conventional method.

What is claimed is:

1. A method of diametrally expanding an elastic tube, which comprises the steps of:

introducing a hollow supporting body into a hole for housing said hollow supporting body therein at a rearward portion of an expansion member;

inserting a distal end portion of said expansion member into an elastic tube, said expansion member having on a surface thereof a solidified layer of water; said distal end portion of said expansion member being tapered, a tip end of which has a diameter which is equal to or smaller than an inner diameter of said elastic tube;

melting a surface of said solidified layer of water to make said surface of said solidified layer into a low frictional surface;

moving said elastic tube over said low frictional surface to diametrally expand said elastic tube on said expansion member; and gradually withdrawing said hollow supporting body from said hole therby allowing said elastic tube to be maintained on an outer surface of said hollow supporting body.

2. A method of diametrally expanding an elastic tube, which comprises the steps of:

encasing or embedding a hollow supporting body in a rearward portion of a solidified layer of water of an expansion member; said expansion member having said solidified layer of water on at least a surface thereof;

inserting a distal end portion of said expansion member into an elastic tube, said distal end portion of said expansion member being tapered, a tip end of which has a diameter which is equal to or smaller than an inner diameter of said elastic tube;

melting a surface of said solidified layer of water to make said surface of said solidified layer into a low frictional surface;

moving said elastic tube over said low frictional surface to diametrally expand said elastic tube on said expansion member; and melting and eliminating said solidified layer of water in its entirety thereby allowing said expanded elastic tube to be maintained on an outer surface of said hollow supporting body.

* * * * *